United States Patent
Mukai et al.

(10) Patent No.: US 9,106,984 B2
(45) Date of Patent: Aug. 11, 2015

(54) PON SYSTEM, SUBSCRIBER-SIDE TERMINAL APPARATUS, STATION-SIDE TERMINAL APPARATUS, AND POWER SAVING METHOD

(75) Inventors: Hiroaki Mukai, Tokyo (JP); Kaori Mie, Tokyo (JP); Koshi Sugimura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/391,511

(22) PCT Filed: Aug. 21, 2009

(86) PCT No.: PCT/JP2009/064672
§ 371 (c)(1),
(2), (4) Date: Feb. 21, 2012

(87) PCT Pub. No.: WO2011/021307
PCT Pub. Date: Feb. 24, 2011

(65) Prior Publication Data
US 2012/0148246 A1    Jun. 14, 2012

(51) Int. Cl.
*H04B 10/20* (2006.01)
*H04J 14/00* (2006.01)
(Continued)

(52) U.S. Cl.
CPC ...... *H04Q 11/0067* (2013.01); *H04L 12/40013* (2013.01); *H04Q 2011/0079* (2013.01)

(58) Field of Classification Search
CPC .......... H04Q 2011/0079; H04Q 11/0067; H04Q 11/00; H04Q 11/0001; H04Q 11/0062; H04Q 2011/0086; H04L 12/40013; H04L 41/0833; H04J 14/0239; H04J 14/0245; H04J 14/0246; H04J 14/0247; H04J 14/0249; H04J 14/025; H04J 14/0252; H04B 1/1615

USPC ....................................................... 398/58–73
See application file for complete search history.

(56) References Cited

U.S. PATENT DOCUMENTS 5,504,606 A * 4/1996 Frigo .............................. 398/58
7,287,175 B2 * 10/2007 Vereen et al. ................. 713/320
(Continued)

FOREIGN PATENT DOCUMENTS

| CN | 1859438 A | 11/2006 |
| CN | 101132233 A | 2/2008 |

(Continued)

OTHER PUBLICATIONS

ITUT Standards, GPON power conservation, May 2009, Series G: Transmission Systems and Media, Digital Systems and Networks, Supplement 45, All Document.*
(Continued)

*Primary Examiner* — Ken Vanderpuye
*Assistant Examiner* — Dibson Sanchez
(74) *Attorney, Agent, or Firm* — Oblon, McClelland, Maier & Neustadt, L.L.P.

(57) ABSTRACT

In a PON system, an ONU includes a receive buffer that stores therein a signal in a downstream direction transmitted from an OLT and a PON control unit that controls transition to a power-saving state and transition to a normal state for the reception buffer. The OLT includes a transmission buffer that stores transmission data to be transmitted to the ONU and the PON control unit that transmits the downstream power-saving-state transition request that requests the ONU to transition to the downstream power-saving state when it is determined that transmission data addressed to the ONU is not present in the transmission buffer. The PON control unit sets the reception buffer to a power-saving state for a predetermined downstream sleep time requested based on the downstream power-saving-state transition request.

27 Claims, 13 Drawing Sheets

(51) Int. Cl.
*H04Q 11/00* (2006.01)
*H04L 12/40* (2006.01)

(56) References Cited

U.S. PATENT DOCUMENTS

| | | | |
|---|---|---|---|
| 7,391,746 B2* | 6/2008 | Morimoto et al. | 370/311 |
| 8,000,602 B2* | 8/2011 | Haran et al. | 398/72 |
| 8,014,674 B2* | 9/2011 | Gao et al. | 398/72 |
| 8,139,937 B2* | 3/2012 | Kim et al. | 398/38 |
| 8,346,082 B2* | 1/2013 | Yoon et al. | 398/72 |
| 8,467,677 B2* | 6/2013 | Straub et al. | 398/20 |
| 8,565,601 B2 | 10/2013 | Nakura et al. | |
| 8,625,987 B2* | 1/2014 | Pfeiffer et al. | 398/33 |
| 8,687,960 B2 | 4/2014 | Hirano et al. | |
| 8,774,621 B2 | 7/2014 | Mukai | |
| 2004/0136712 A1* | 7/2004 | Stiscia et al. | 398/60 |
| 2004/0235536 A1 | 11/2004 | Kim et al. | |
| 2005/0143146 A1 | 6/2005 | Kim | |
| 2005/0201411 A1 | 9/2005 | Shibata et al. | |
| 2006/0029389 A1* | 2/2006 | Cleary et al. | 398/33 |
| 2006/0053309 A1* | 3/2006 | Vereen et al. | 713/300 |
| 2006/0067691 A1* | 3/2006 | Hirano et al. | 398/71 |
| 2007/0142098 A1* | 6/2007 | Behzad et al. | 455/574 |
| 2007/0223490 A1* | 9/2007 | Mizutani et al. | 370/395.6 |
| 2008/0273877 A1 | 11/2008 | Palacharla et al. | |
| 2010/0110952 A1* | 5/2010 | Diab | 370/311 |
| 2010/0111523 A1* | 5/2010 | Hirth et al. | 398/25 |
| 2010/0115306 A1* | 5/2010 | Diab | 713/320 |
| 2010/0118753 A1* | 5/2010 | Mandin et al. | 370/311 |
| 2010/0260497 A1 | 10/2010 | Yoon et al. | |
| 2010/0316387 A1* | 12/2010 | Suvakovic | 398/98 |
| 2011/0158638 A1 | 6/2011 | Mie et al. | |
| 2012/0063770 A1 | 3/2012 | Tsuji | |
| 2012/0128357 A1 | 5/2012 | Mukai et al. | |
| 2012/0148246 A1 | 6/2012 | Mukai et al. | |
| 2014/0079396 A1 | 3/2014 | Hirano et al. | |
| 2014/0086584 A1 | 3/2014 | Mukai et al. | |
| 2014/0193150 A1 | 7/2014 | Mukai et al. | |

FOREIGN PATENT DOCUMENTS

| | | |
|---|---|---|
| JP | 63 119335 | 5/1988 |
| JP | 2004 134970 | 4/2004 |
| JP | 2005 260360 | 9/2005 |
| JP | 2006 524929 | 11/2006 |
| JP | 2008 263281 | 10/2008 |
| JP | 2008 295039 | 12/2008 |
| JP | 2009 55301 | 3/2009 |
| JP | 2009 60509 | 3/2009 |
| JP | 2009 134696 | 6/2009 |
| JP | 2009 171424 | 7/2009 |
| KR | 10-2004-0092830 | 11/2004 |
| KR | 10-0539804 | 7/2005 |
| KR | 10-2009-0041163 | 4/2009 |

OTHER PUBLICATIONS

Haran, O., et al., "ONU power-save annex," PMC-Sierra Inc., Total pp. 10, (Apr. 2008).

Choi, S., et al., "Dynamic Bandwidth Allocation Algorithm for Multimedia Services over Ethernet PONs," ETRI Journal, vol. 24, No. 6, pp. 465-468, (Dec. 2002).

International Search Report Issued Dec. 1, 2009 in PCT/JP09/64672 Filed Aug. 21, 2009.

Office Action mailed Apr. 19, 2013, in Korean Patent Application No. 10-2012-7007149 (with English-language translation).

Extended European Search Report mailed Oct. 28, 2013, in European Patent Application No. 09848503.0.

Mandin, "EPON Powersaving via Sleep Mode," PMC-Sierra, Sep. 2008.

Freude et al., "An Optically Powered Fibre Network for Heterogeneous Subscribers," Transparent Optical Networks. ICTON 2009.

International Telecommunication Union, "White Paper: Means and impact of GPON power conservation", Telecommunication Standardization Sector, Study Group 15, TD97 (WP 1/15), (Dec. 2008), XP17444919A.

International Telecommunication Union, "Amendment 1-Specification of the ONU registration method and various clarifications", ITU-T Telecommunication Standardization Sector of ITU, Series G, G.984.3, Amendment 1, Series G: Transmission Systems and Media, Digital Systems and Networks, Digital sections and digital line system—Optical line systems for local and access networks, Gigabit-capable Passive Optical networks (G-PON): Transmission convergence layer specification, Total 16 pages, (Feb. 2009), XP17436107A.

Mangin, Christopher and Mukai, Hiroaki, "Type B Optical Link Protection", Draft Contribution to IEEE 1904.1, TF3,Total 7 pages, (Server Date Oct. 18, 2010), XP17737894A.

IEEE P 1904.1., "Service iteroperability in Ethernet Passive Optical Networks (SIEPON)", pp. 9-1 to 9-18,(Aug. 2010).

Draft Amendment to IEEE Std. 802.3-2008, IEEE 8O2.3zv 10G-EPON Task Force, IEEE Draft P802.3av/D1.3, Section 93. Multipoint MAC Control, (Apr. 2008).

Office Action issued on Jun. 5, 2014 in Chinese Patent Application No. 200980161040.1 with a partial English translation.

Chinese Office Action issued Oct. 8, 2014, in China Patent Application No. 200980161040.1 (with English translation).

Extended European Search Report mailed Jan. 9, 2015 for European Patent Application No. 09 848 503.0-1851.

* cited by examiner

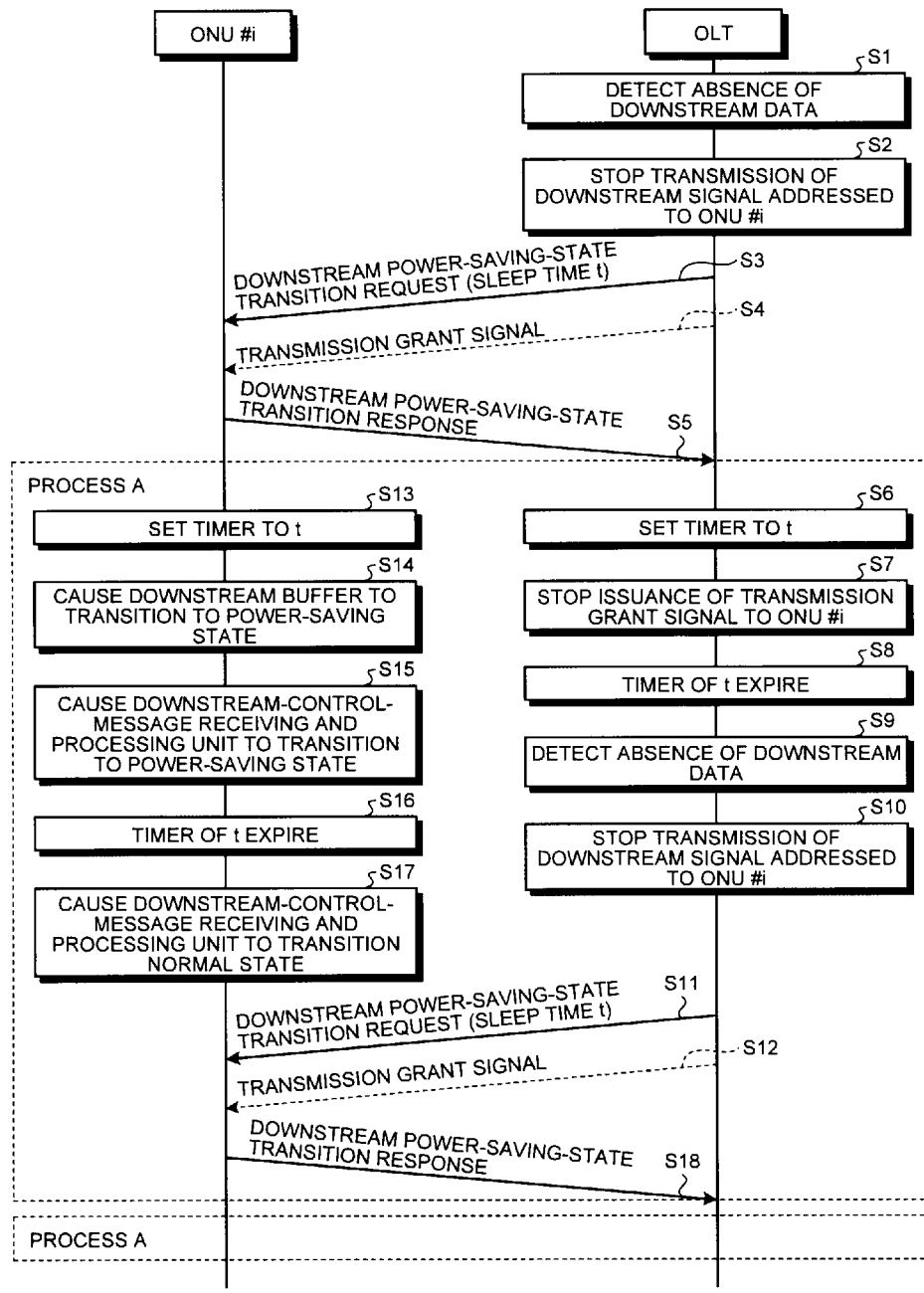

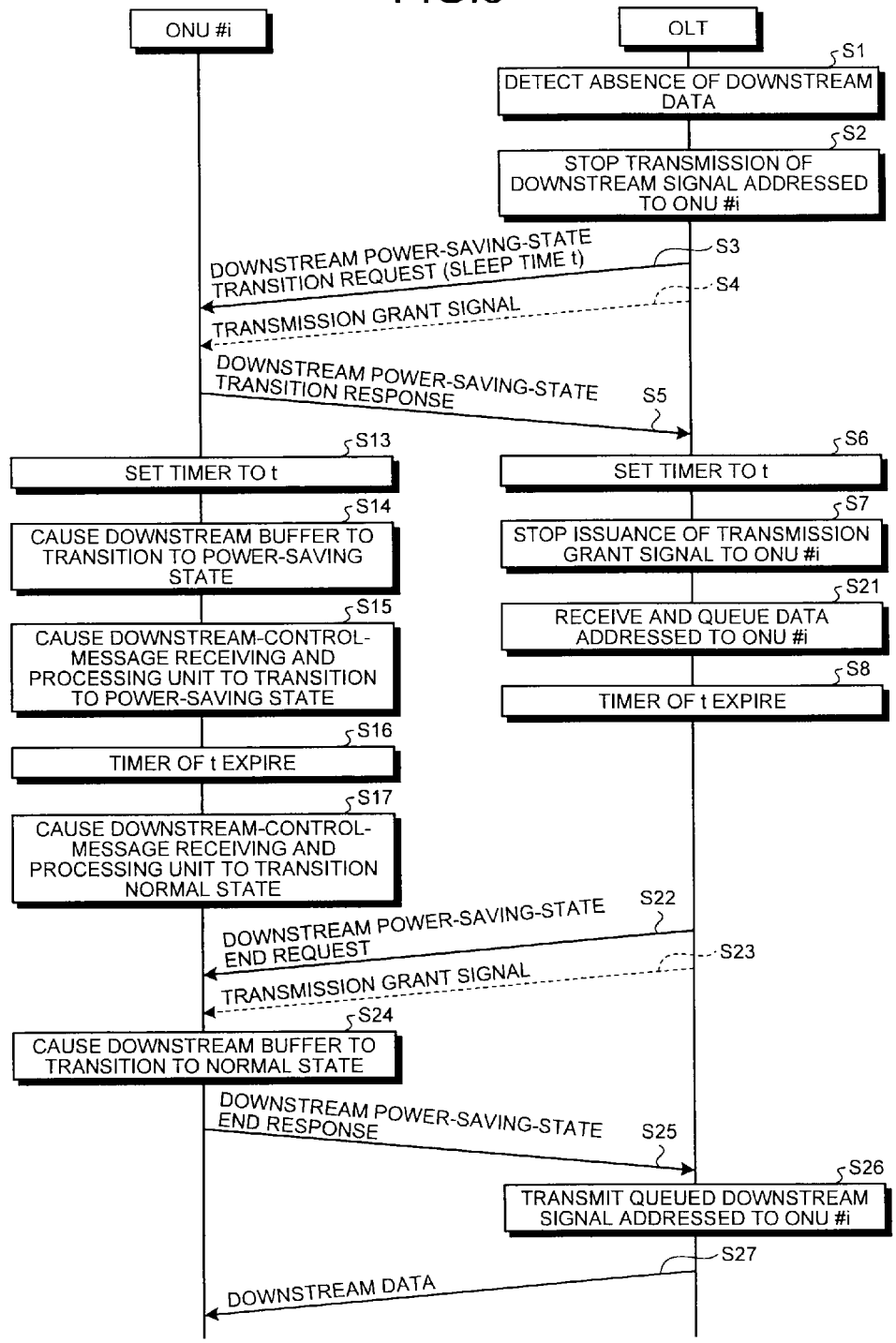

FIG.4

| | Message name | Function | Trigger | Times sent | Effect of receipt |
|---|---|---|---|---|---|
| 21 | Sleep mode change acknowledge | To acknowledge ONU sleep mode change request | "Sleep mode change request" PLOAM message received | 3 | ONU changes sleep state machine state |
| 22 | Sleep | To put asleep all ONUs in sleep mode | OLT completed handling all sleeping ONUs | 3 | ONUs in sleep mode are falling asleep |

FIG.5

| Sleep mode change acknowledgment | | |
|---|---|---|
| Octet | Content | Description |
| 1 | ONU-ID | Directed message to one ONU |
| 2 | 00010101 | Message identification "Sleep mode change acknowledgement" |
| 3 | Frame Counter 1 | Six MSBs of the 30-bit superframe counter of the first frame of activity after the sleep period. |
| 4 | Frame Counter 2 | |
| 5 | Frame Counter 3 | |
| 6 | Frame Counter 4 | Eight LSBs of the 30-bit superframe counter of the first frame of activity after the sleep period. |
| 7 | 000000MP | M: ONU should begin sleep immediately (when M=1)<br>P: Power-save mode<br>P='0': ONU is in normal power mode<br>P='1': ONU is in sleep mode |
| 8-12 | Reserved | Should be 0 |
| Note: Usage of this message is optional. | | |

FIG.6

| Sleep | | |
|---|---|---|
| Octet | Content | Description |
| 1 | ONU-ID or 11111111 | Directed message to one ONU or all ONUs. As a broadcast to all ONUs, ONU-ID=0xFF |
| 2 | 00010110 | Message identification "Sleep" |
| 3 | Frame Counter 1 | Six MSBs of the 30-bit superframe counter of the first frame of activity after the sleep period. |
| 4 | Frame Counter 2 | |
| 5 | Frame Counter 3 | |
| 6 | Frame Counter 4 | Eight LSBs of the 30-bit superframe counter of the first frame of activity after the sleep period. |
| 7-12 | Reserved | Should be 0 |
| Note: Usage of this message is optional. | | |

FIG.7

|  | Message name | Function | Trigger | Times sent | Effect of receipt |
|---|---|---|---|---|---|
| 10 | Sleep mode change request | To request from the OLT to change the ONU sleep-mode | Change detected in ONU activity or previously transmitted messages were not acknowledged | 3 | OLT acknowledges the request |

FIG.8

| Sleep mode change request |||
|---|---|---|
| Octet | Content | Description |
| 1 | ONU-ID | Indicates the ONU sourcing this message |
| 2 | 00001010 | Message identification "Sleep mode change request" |
| 3 | 0000000P | P: Power-save requested mode<br>P='0': ONU requests to deactivate sleep mode<br>P='1': ONU requests to activate sleep mode |
| 4-12 | Reserved | Should be 0 |
| Note: Usage of the message is optional. |||

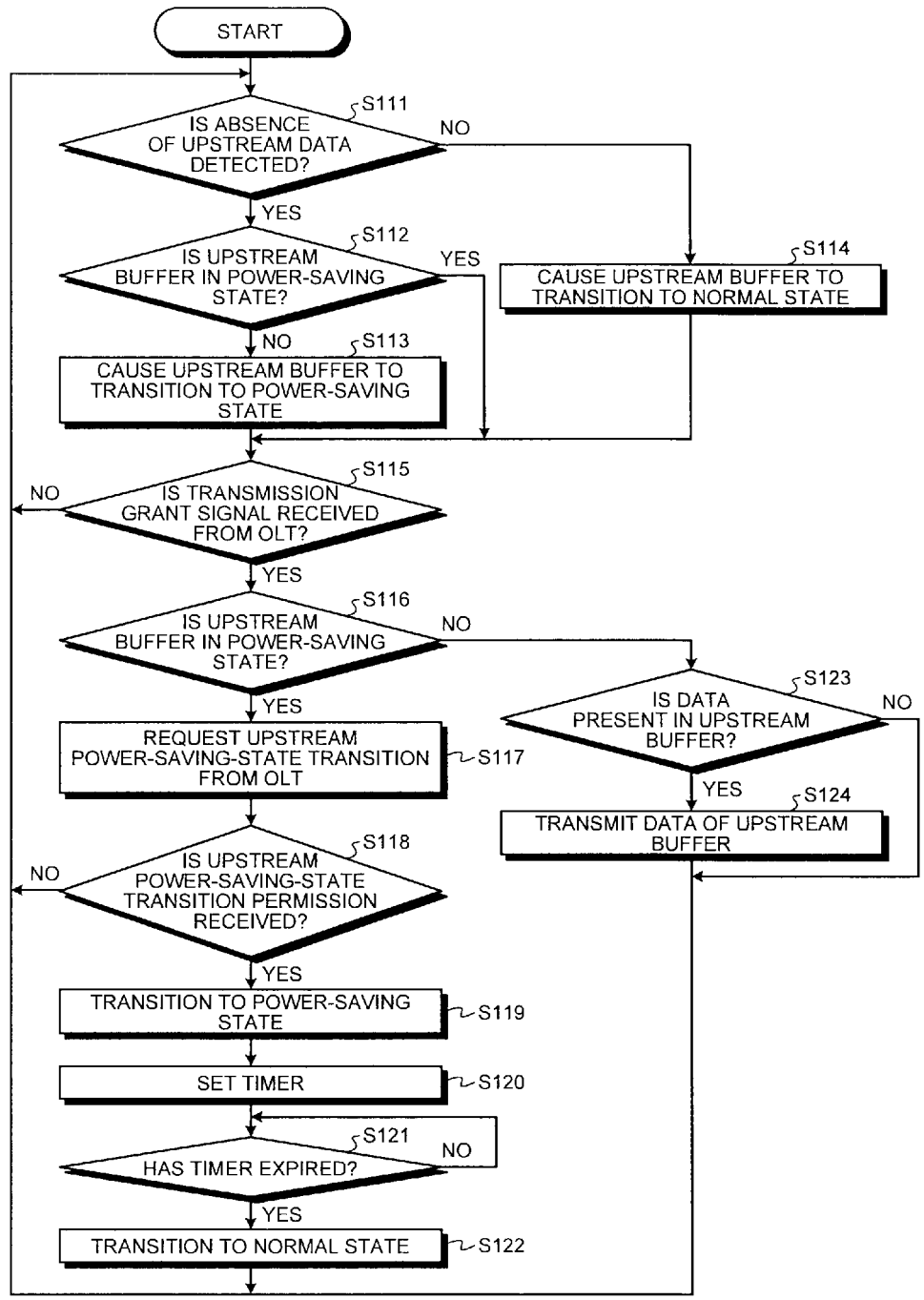

PON SYSTEM, SUBSCRIBER-SIDE TERMINAL APPARATUS, STATION-SIDE TERMINAL APPARATUS, AND POWER SAVING METHOD

FIELD

The present invention relates to a PON (Passive Optical Network) system composed of an OLT (Optical Line Terminal: station-side terminal apparatus) and a plurality of ONUs (Optical Network Unit: subscriber-side terminal apparatus).

BACKGROUND

In the PON system, communication is performed while synchronizing between an OLT and ONUs so that data in an upstream direction to be transmitted from the ONUs does not collide. The OLT plans to give transmission permission to each ONU so that data in the upstream direction does not collide. At this time, delay due to a distance from each ONU is considered. Therefore, the OLT measures round trip time from each ONU, however, there is a variation of transmission paths, such as jitter and wander, in a transmission by optical fibers, so that measurement needs to be performed periodically.

On the other hand, data communication is not always performed, and, for example during nighttime, data communication is not performed at all. However, measurement of the round-trip time is periodically performed as above regardless of the presence or absence of data communication. Maintaining the ONU in a state capable of constant communication for measuring the round-trip time even when data communication is not performed results in wasting power. Therefore, a technology is studied in which the ONU is intermittently transitioned to a power-saving state by requesting transition to the power-saving state from the ONU (for example, see Non Patent Literature 1).

CITATION LIST

Non Patent Literature

Non Patent Literature 1: ITU-T (International Telecommunication Union Telecommunication standardization sector) SG15Q2 Intended type of document (R-C-TD): GR-4, "ONU power-save annex", PMC-Sierra, April 2008

SUMMARY

Technical Problem

According to the technology described in the above Non Patent Literature 1, the ONU intermittently enters the power-saving state. When there is a transition request to the power-saving state from the ONU, the OLT specifies time during which the power-saving state is maintained and the ONU becomes the power-saving state for the specified time. Moreover, when transmission data (downstream data) addressed to the ONU in the power-saving state occurs, the downstream data is transmitted after finishing the power-saving state. Because the ONU cannot recognize the presence or absence of downstream data in advance, in practice, even when downstream data from the OLT is not present, it is needed to return a buffer for downstream data from the power-saving state at the time when one power-saving state is finished (refresh time) in order to be in a state (normal state) capable of receiving downstream data. Therefore, there is a problem in that the ONU consumes unnecessary power when downstream data is not present.

The present invention is achieved in view of the above, and has an object to obtain a PON system and a power saving method capable of reducing power consumption of an ONU.

Solution to Problem

A PON system according to an aspect of the present invention is a PON system in which a station-side terminal apparatus and a subscriber-side terminal apparatus are connected by using an optical line, wherein the subscriber-side terminal apparatus includes an optical receiver that receives an optical signal from the station-side terminal apparatus, and a power-saving control unit that intermittently sets the optical receiver to a receiving state and controls power of the subscriber-side terminal apparatus by a plurality of different power-saving modes, and the station-side terminal apparatus includes an optical transmitter that transmits an optical signal to the subscriber-side terminal apparatus, and a control unit that controls the different power-saving modes by using a control message transmitted via this optical transmitter.

Advantageous Effects of Invention

The PON system, the subscriber-side terminal apparatus, the station-side terminal apparatus, and the power saving method according to the present invention have an effect that power consumption of the subscriber-side terminal apparatus can be reduced.

BRIEF DESCRIPTION OF DRAWINGS

FIG. 2 is a sequence diagram illustrating an example of a power-saving control procedure in the first embodiment.

FIG. 3 is a sequence diagram illustrating another example of the power-saving control procedure in the first embodiment.

FIG. 4 is a diagram illustrating formats of a "Sleep mode change acknowledge" message and a "Sleep" message.

FIG. 5 is a diagram illustrating a format of the "Sleep mode change acknowledge" message.

FIG. 6 is a diagram illustrating a format of the "Sleep" message.

FIG. 7 is a diagram illustrating a format of a "Sleep mode change request" message.

FIG. 8 is a diagram illustrating a format of the "Sleep mode change request" message.

FIG. 15 is a flowchart illustrating an example of a power-saving control procedure performed by an ONU in the second embodiment.

DESCRIPTION OF EMBODIMENTS

Exemplary embodiments of a PON system and a power saving method according to the present invention will be explained below in detail based on the drawings. This invention is not limited to the embodiments.

First Embodiment

Figure 1:
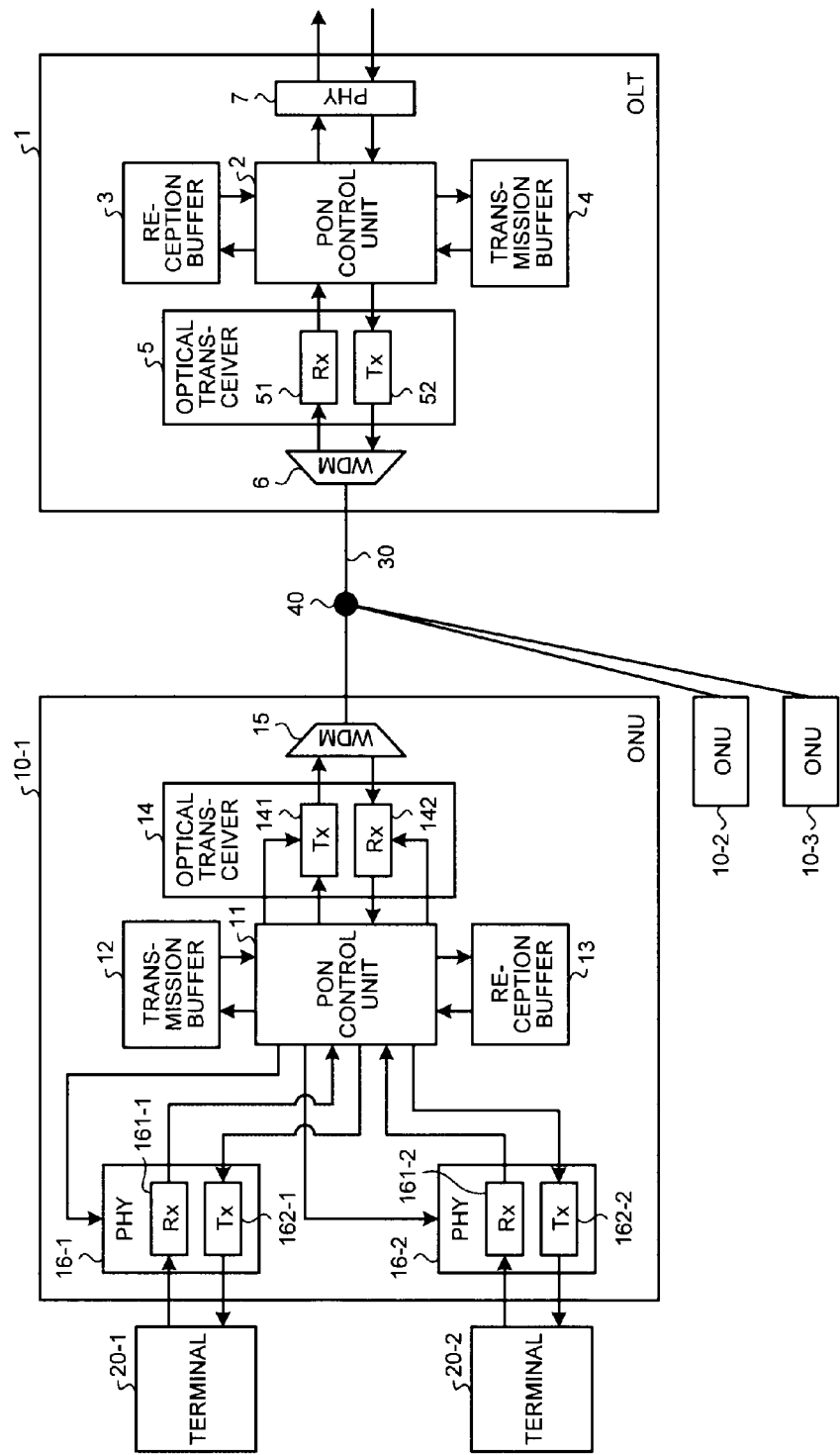
FIG. 1 is a diagram illustrating a configuration example of a first embodiment of a PON system according to the present invention.

FIG. 1 is a diagram illustrating a configuration example of the first embodiment of a PON system according to the present invention. As shown in FIG. 1, the PON system in the present embodiment includes an OLT 1 and ONUs 10-1 to 10-3. The OLT 1 and the ONUs 10-1 to 10-3 are connected by a subscriber line 30 via a splitter 40. The splitter 40 splits the subscriber line 30 connected to the OLT 1 into the number of the ONUs 10-1 to 10-3. Moreover, the ONU 10-1 is connected to terminals 20-1 and 20-2. In the present embodiment, the number of the ONUs is three as an example, however, the number of the ONUs is not limited thereto and can be any number.

The OLT 1 includes a PON control unit 2 that performs a process on the OLT side based on a PON protocol, a reception buffer 3 as a buffer that stores therein upstream data to be received from the ONUs 10-1 to 10-3, a transmission buffer 4 as a buffer that stores therein downstream data to be transmitted to the ONUs 10-1 to 10-3, an optical transceiver 5 that performs a transmission and reception process of an optical signal, a WDM (Wavelength Division Multiplexing) coupler (WDM) 6 that multiplexes wavelengths of upstream data and downstream data, and a physical-layer processing unit (PHY) 7 that realizes a physical interface function of an NNI (Network Node Interface) with the network. The optical transceiver 5 includes an optical receiver (Rx: Receiver) 51 that performs a reception process and an optical transmitter (Tx: Transmitter) 52 that performs a transmission process.

The ONU 10-1 includes a PON control unit 11 that performs a process on the ONU side based on the PON protocol, a transmission buffer (upstream buffer) 12 as a buffer that stores therein transmission data (upstream data) to the OLT 1, a reception buffer (downstream buffer) 13 as a buffer that stores therein reception data (downstream data) from the OLT 1, an optical transceiver 14, a WDM 15 that multiplexes wavelengths of upstream data and downstream data, and physical-layer processing units (PHYs) 16-1 and 16-2 that realize a physical interface function of an UNI (User Network Interface) with the terminals 20-1 and 20-2, respectively.

The optical transceiver 14 includes an optical transmitter (Tx: Transmitter) 141 that performs a transmission process and an optical receiver (Rx: Receiver) 142 that performs a reception process. The PHY 16-1 includes a receiving unit (Rx: Receiver) 161-1 that performs a reception process and a transmitting unit (Tx: Transmitter) 162-1 that performs a transmission process, and the PHY 16-2 includes a receiving unit (Rx: Receiver) 161-2 that performs a reception process and a transmitting unit (Tx: Transmitter) 162-2 that performs a transmission process.

Two terminals are connected to the ONU 10-1, however, the number of the terminals is not limited thereto and can be any number, and the physical-layer processing units (PHYs) are provided to correspond to the number of the terminals. Moreover, in FIG. 1, the configuration example of the ONU 10-1 is illustrated as representative, however, the ONUs 10-2 and 10-3 also have the same configuration as that of the ONU 10-1.

In the present embodiment, the PON control unit 2 of the OLT 1 performs a bandwidth allocation of upstream data to give transmission permission to each of the ONUs 10-1 to 10-3 so that transmission time periods do not overlap with each other thereby preventing collision of transmission data from the ONUs 10-1 to 10-3 in the same manner to the conventional PON system. Any method can be used for this bandwidth allocation, and, for example, it is possible to use a Dynamic Bandwidth Allocation Algorithm described in ""HuhDynamic Bandwidth Allocation Algorithm for Multimedia Services over Ethernet (registered trademark) PONs", ETRI Journal, Volume 24, Number 6, December 2002 p. 465 to p. 466 written by Su-il Choi and Jae-doo".

Next, the overall operation of the OLT 1 and the ONUs 10-1 to 10-3 in the present embodiment is explained. The PON control unit 2 stores downstream data (downstream communication data) received from the network via the PHY 7 in the transmission buffer 4. When transmitting data from the OLT 1, the PON control unit 2 reads out the downstream data stored in the transmission buffer 4 and outputs it to the optical transceiver 5, the Tx 52 of the optical transceiver 5 outputs the transmission data to the WDM 6 as an optical signal, and the WDM 6 performs wavelength multiplexing on the optical signal output from the optical transceiver 5 and outputs it to the ONUs 10-1 to 10-3 via the subscriber line 30 as a downstream signal. Moreover, when the PON control unit 2 transmits a control message such as a transmission grant signal that transmits an instruction of transmission permission, the PON control unit 2 outputs the generated control message to the optical transceiver 5 and thereafter the control message is transmitted to the ONUs 10-1 to 10-3 in the same manner to downstream data. In the PON system in FIG. 1, the WDMs 6 and 15 are used for performing wavelength multiplexing, however, in the case of communication at a single wavelength, the WDMs 6 and 15 are not necessary.

In the ONUs 10-1 to 10-3, when a downstream signal is received from the OLT 1, the WDM 15 separates the downstream signal to output it to the optical transceiver 14 and the Rx 142 of the optical transceiver 14 converts the downstream signal into downstream data of an electrical signal and outputs it to the PON control unit 11. The PON control unit 11 stores the downstream data output from the Rx 142 of the optical transceiver 14 in the reception buffer 13. The PON control unit 11 reads out the downstream data stored in the reception buffer 13 and outputs it to both or one of the PHYs 16-1 and 16-2 depending on the destination of the data. The PHYs 16-1 and 16-2 that received the downstream data performs a predetermined process on the downstream data and transmits it to the terminals 20-1 and 20-2 connected thereto.

On the other hand, when transmitting upstream data from the ONUs 10-1 to 10-3, the PON control unit 11 stores the upstream data obtained from the terminals 20-1 and 20-2 via the PHYs 16-1 and 16-2 in the transmission buffer 12. Then, the PON control unit 11 reads out the upstream data stored in the transmission buffer based on transmission permission given from the OLT 1 and outputs it to the optical transceiver 14. The Tx 141 of the optical transceiver 14 converts the upstream data into an optical signal (upstream signal) and transmits it to the OLT 1 via the WDM 15 and the subscriber line 30.

The PON control unit 2 of the OLT 1 stores the upstream data received from the ONUs 10-1 to 10-3 via the subscriber line 30, the WDM 6, and the Rx 51 of the optical transceiver 5 in the reception buffer 3. Moreover, the PON control unit 2 reads out the upstream data stored in the reception buffer 3 and outputs it to the network via the PHY 7.

Moreover, in the ONUs 10-1 to 10-3, for the control message from the OLT 1, the PON control unit 11 receives the control message via the WDM 15 and the Rx 142 of the optical transceiver 14 and performs an operation based on the instruction of the control message, generation of a response to the control message, and the like.

Next, a power-saving control operation of the present embodiment is explained. In the present embodiment, the OLT 1 instructs the ONUs 10-1 to 10-3 in which downstream data is not present to transition to a downstream power-saving state in which components that perform a downstream data process are set to the power-saving state. The ONUs 10-1 to 10-3 instructed to transition to the downstream power-saving state transition to the downstream power-saving state.

FIG. 2 is a sequence diagram illustrating an example of the power-saving control procedure in the present embodiment. In the following explanation, the ONUs 10-1 to 10-3 connected to the OLT 1 are generally expressed as an ONU #i (i=1, 2, . . . , N: N is the number of ONUs). The configuration of the ONU #i is same as the configuration of the ONU 10-1 shown in FIG. 1.

First, when the PON control unit 2 of the OLT 1 detects that downstream data to the ONU #i is not present by referring to the transmission buffer 4 (Step S1), the PON control unit 2 stops transmission of a downstream signal addressed to the ONU #i (Step S2). This means that, hereafter, data addressed to the ONU #i to be received from the network via the PHY 7 is stored in the transmission buffer 4. Then, the PON control unit 2 of the OLT 1 transmits a downstream power-saving-state transition request (permission) to request (or grant) transition to the downstream power-saving state (first sleep mode) to the ONU #i (Step S3). The PON control unit 2 transmits this downstream power-saving-state transition request including a sleep time (sleep time) t during which the downstream power-saving state is maintained.

After transmitting the downstream power-saving-state transition request, the PON control unit 2 of the OLT 1 transmits the transmission grant signal that is the control message for giving transmission permission to the ONU #i (Step S4). This transmission grant signal is provided for the ONU #i to transmit a response to the downstream power-saving-state transition request.

In the ONU #i that received the downstream power-saving-state transition request, the PON control unit 11 transmits a downstream power-saving-state transition response that is a response indicating reception of the request to the downstream power-saving-state transition request to the OLT 1 (Step S5).

In the OLT 1 that received the downstream power-saving-state transition response, the PON control unit 2 sets a timer for measuring the sleep time t (Step S6) and stops issuance of the transmission grant signal to the ONU #i (Step S7). Then, when the timer expires (when time of t has elapsed) (Step S8), the presence or absence of downstream data to the ONU #i is detected by referring to the transmission buffer 4. When it is detected that downstream data is not present (Step S9), transmission of a downstream signal addressed to the ONU #i is stopped (Step S10). Then, the PON control unit 2 transmits the downstream power-saving-state transition request (Step S11) and transmits the transmission grant signal (Step S12) again.

On the other hand, in the ONU #i that received the downstream power-saving-state transition request, when the downstream power-saving-state transition response is transmitted, the timer for measuring the sleep time t included in the downstream power-saving-state transition request is set (Step S13). Then, the ONU #i causes the reception buffer 13 to transition to the power-saving state (Step S14). Moreover, the ONU #i causes a downstream-control-message receiving and processing unit (such as the Rx 142 of the optical transceiver 14 and the downstream-control-message processing function part of the PON control unit 11) to transition to the power-saving state (downstream power-saving state) (Step S15). The downstream power-saving state set at Step S14 and Step S15 is described later.

In the ONU #i, when the timer set at Step S13 expires (time of t has elapsed) (Step S16), the downstream-control-message receiving and processing unit transitioned to the power-saving state at Step S15 is transitioned to a normal state from the power-saving state (Step S17). Although the downstream-control-message receiving and processing unit becomes capable of receiving the control message, some devices that do not need to be operated at the time of reception of the control message, such as the reception buffer 13, maintains the power-saving state and therefore the ONU #i is transitioned to a partial power-saving state (second sleep mode). Then, when the ONU #i receives the downstream power-saving-state transition request transmitted at Step S11, the ONU #i transmits the downstream power-saving-state transition response to the OLT 1 (Step S18)

The above processes at Step S13 to Step S18 are defined as processes A, and the processes A are repeated while the OLT 1 does not detect (does not receive) downstream data addressed to the ONU #i. While repeating these processes A, the downstream-control-message receiving and processing unit once returns to the normal state every sleep time t, however, the reception buffer 13 can maintain the power-saving state.

The downstream power-saving state of the ONU #i is explained. The reception buffer 13 is transitioned to the power-saving state at Step S14 and the downstream-control-message receiving and processing unit is transitioned to the power-saving state at Step S15, and the power-saving state set at theses two steps is called the downstream power-saving state of the ONU #i. Moreover, the reception buffer 13 and the downstream-control-message receiving and processing unit together can be considered as a downstream-signal processing unit and the downstream power-saving state can be considered as a state in which the downstream-signal processing unit is transitioned to the power-saving state.

The reception buffer 13 is transitioned to the power-saving state at Step S14 and the downstream-control-message receiving and processing unit is transitioned to the power-saving state at Step S15. The downstream-control-message receiving and processing unit transitioned to the power-saving state at Step S15 is a component related to a process of the control message transmitted from the OLT 1 such as the Rx 142 of the optical transceiver 14 and the control-message processing function part of the PON control unit 11. As above, even when the state in which the OLT 1 does not detect downstream data addressed to the ONU #i continues for the sleep time t or more, the OLT 1 transmits the next downstream power-saving-state transition request as the control message at Step S11, so that the OLT 1 separately causes a part related to the control message and a part not related to the control message to transition to the power-saving state.

In the example in FIG. 2, transition to the power-saving state is performed separately at Step S14 and Step S15, however, the transition can be performed simultaneously instead of separating the step. In this case also, the downstream-control-message receiving and processing unit is transitioned to the normal state after the timer expires.

Moreover, at Step S14, it is applicable to cause the Tx 162-1 of the PHY 16-1 and the Tx 162-2 of the PHY 16-2 to transition to the power-saving state in addition to the reception buffer 13. Furthermore, a device (signal processing unit) to be transitioned to the power-saving state in the second sleep mode is not limited to these and any device can be selected and transitioned to the power-saving state so long as the device is not necessary for the reception process of part or all of the control messages.

Specific examples of a transition method to the downstream power-saving state include the following method. For example, when the reception buffer 13 is composed of a DDR (Double Data Rate) memory, the PON control unit 11 sets the DDR memory to disable by inputting a command to a memory controller. Moreover, the PON control unit 11 sets the Rx 142 to the power-saving state by transmitting an instruction, such as a power-down and a shut-down, to the Rx 142 of the optical transceiver 14. Moreover, for the Tx 162-1 of the PHY 16-1 and the Tx 162-2 of the PHY 16-2, when the PHY 16-1 and the PHY 16-2 support, for example, a power-saving mode defined in IEEE802.3az, the PON control unit 11 instructs to transition to a "Low Power Idle" state.

FIG. 3 is a sequence diagram illustrating another example of the power-saving control procedure in the present embodiment. Step S1 to Step S7 are identical to Step Si to Step S7 in the example in FIG. 2, however, in the example in FIG. 3, after Step S7, the OLT 1 receives transmission data (downstream data) addressed to the ONU #i from the network via the PHY 7 and stores it in the transmission buffer 4 (Step S21). Specifically, because the ONU #i is in a downstream power-saving state and is not in a state capable of receiving downstream data addressed to the ONU #i even if the OLT 1 transmits the downstream data, the OLT 1 queues the downstream data addressed to the ONU #i. Then, when measurement of the timer set at Step S6 expires (time oft has elapsed) (Step S8), the PON control unit 2 transmits a downstream power-saving-state end request indicating an end of the downstream power-saving state to the ONU #i (Step S22). Moreover, the PON control unit 2 transmits the transmission grant signal to the ONU #i (Step S23).

On the other hand, in the ONU #i, after Step S5, in the same manner to FIG. 2, the processes at Step S13 to Step S17 are performed. Then, when the PON control unit 11 of the ONU #i receives the downstream power-saving-state end request transmitted at Step S22, the PON control unit 11 instructs the reception buffer 13 to return to the normal state, thereby causing the reception buffer 13 to transition to the normal state from the power-saving state (Step S24). In the present embodiment, the example of setting the reception buffer 13 to the power-saving state is explained, however, when the Tx 162-1 of the PHY 16-1 and the Tx 162-2 of the PHY 16-2 are also set to the power-saving state as above, these are also transitioned to the normal state.

Then, the PON control unit 11 of the ONU #i transmits a downstream power-saving-state end response that is a response to the downstream power-saving-state end request to the OLT 1 (Step S25). In the OLT 1 that received the downstream power-saving-state end response, the PON control unit 2 reads out downstream data addressed to the ONU #i stored in the transmission buffer 4 (Step S26) and transmits the readout downstream data to the ONU #i (Step S27). Thereafter, communication in the normal state (normal mode) is performed.

Set and release of the downstream power-saving state of the ONU #i is performed by the sequence explained above. The format of the control message used between the OLT 1 and the ONU #i is supplementarily explained.

FIG. 4 to FIG. 6 illustrate three PLOAM (Physical Layer Operation and Maintenance) messages for controlling the sleep mode. Two PLOAM messages among them are messages transmitted from the OLT to the ONU, i.e., a "Sleep mode change acknowledge" message and a "Sleep" message. The remaining one is a "Sleep mode change request" message transmitted from the ONU to the OLT.

FIG. 4 to FIG. 6 are diagrams illustrating the formants of the "Sleep mode change acknowledge" message and the "Sleep" message. FIG. 7 and FIG. 8 are diagrams illustrating the formats of the "Sleep mode change request" message.

The ONU transmits the "Sleep mode change request" message that requests transition to the power-saving state (sleep mode) of itself to the OLT. When the OLT receives the "Sleep mode change request" message, the OLT transmits the "Sleep mode change acknowledge" message as a response. This "Sleep mode change acknowledge" message includes a counter value (which, in other words, is equivalent to the time until returning from the sleep mode) of SuperFrame until returning from the sleep mode in FrameCounter 1 and FrameCounter 4 as shown in FIG. 5.

Figure 9:
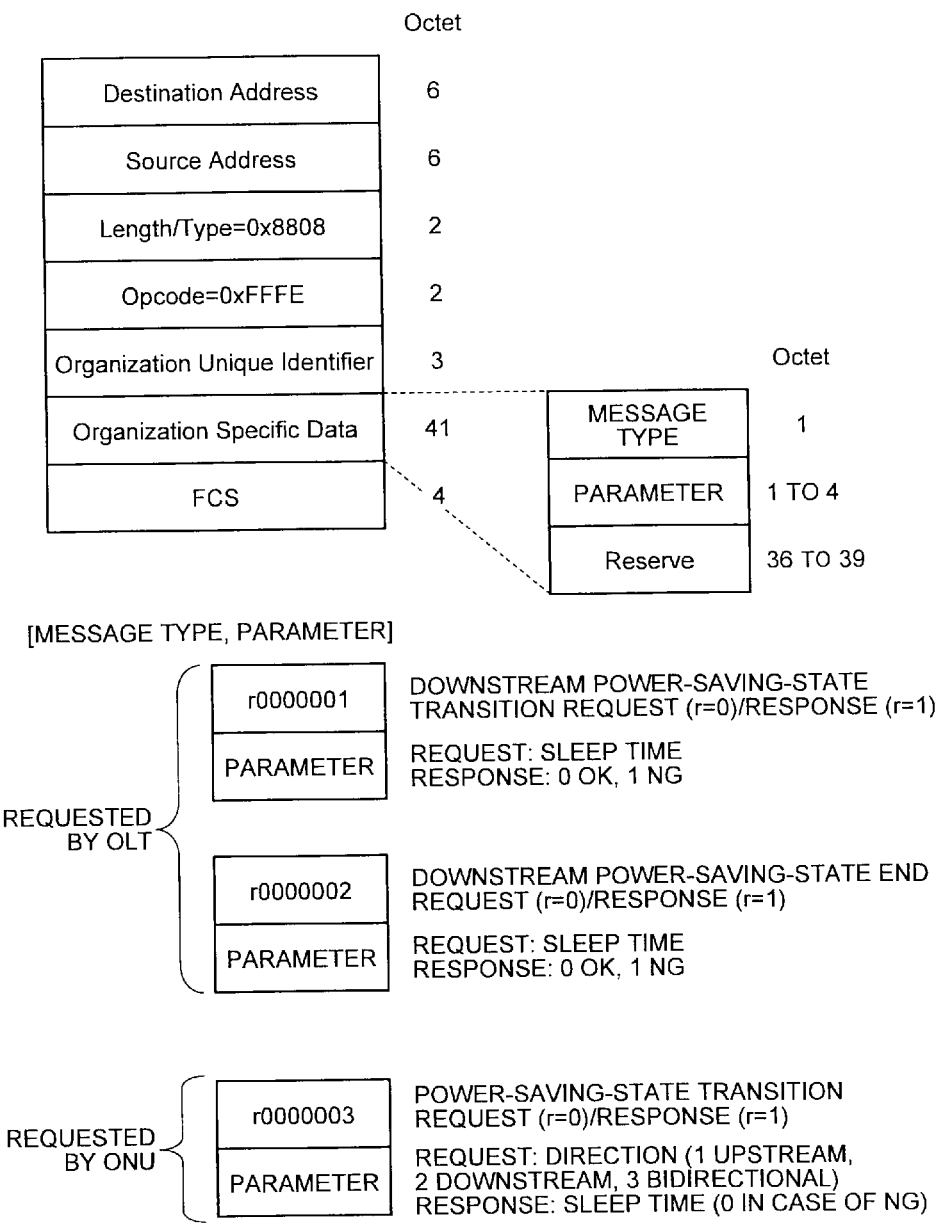
FIG. 9 is a diagram illustrating a format of an enhanced MAC control message.

FIG. 4 to FIG. 8 are examples in which the PLOAM message is used as means for synchronizing between the OLT and the ONU, however, a similar power saving method can be applied also to the PON system of IEEE standard. In IEEE802.3av, an enhanced MAC control message corresponding to the PLOAM message is defined. FIG. 9 illustrates a message format example when the enhanced MAC control message is used. As a message to be requested from the OLT, the downstream power-saving-state transition request and the downstream power-saving-state end request are defined. For these messages, the ONU transmits a response message with the most significant bit of a message type field set to "1". The power-saving-state transition request is defined as a message requested from the ONU. As a parameter of a request message, only upstream, only downstream, and bidirectional are defined. In response to this message, the OLT sets the most significant bit of the message type field to "1" as a response message and specifies a sleep time as the parameter.

In the present embodiment, in addition to the procedure of requesting transition to the sleep mode from the ONU, transition to the power-saving state is instructed from the OLT 1 to the ONU #i. Therefore, a receiver (for example, the reception buffer 13) in a downstream direction can be continuously in the power-saving state compared with the case in which only the procedure of the sleep mode of upstream data is performed, enabling to further reduce the upstream power consumption.

On the other hand, as a format of the control message used in the sequences illustrated in FIG. 2 and FIG. 3, the above message formats in FIG. 4 to FIG. 9 can be used. For example, as the control message of the downstream power-saving-state transition request and the downstream power-saving-state end request transmitted from the OLT 1, it is applicable to use the format of the "Sleep mode change acknowledge" message shown in FIGS. 4 and 5 or a format conforming thereto. For example, in the case of the downstream power-saving-state transition request, P of 7Octet is set to "1", and, in the case of the downstream power-saving-state end request, P of 7Octet is set to "0". In the present embodiment, in the following explanation, an example of using the message format shown in FIG. 9 is illustrated.

Figure 10:
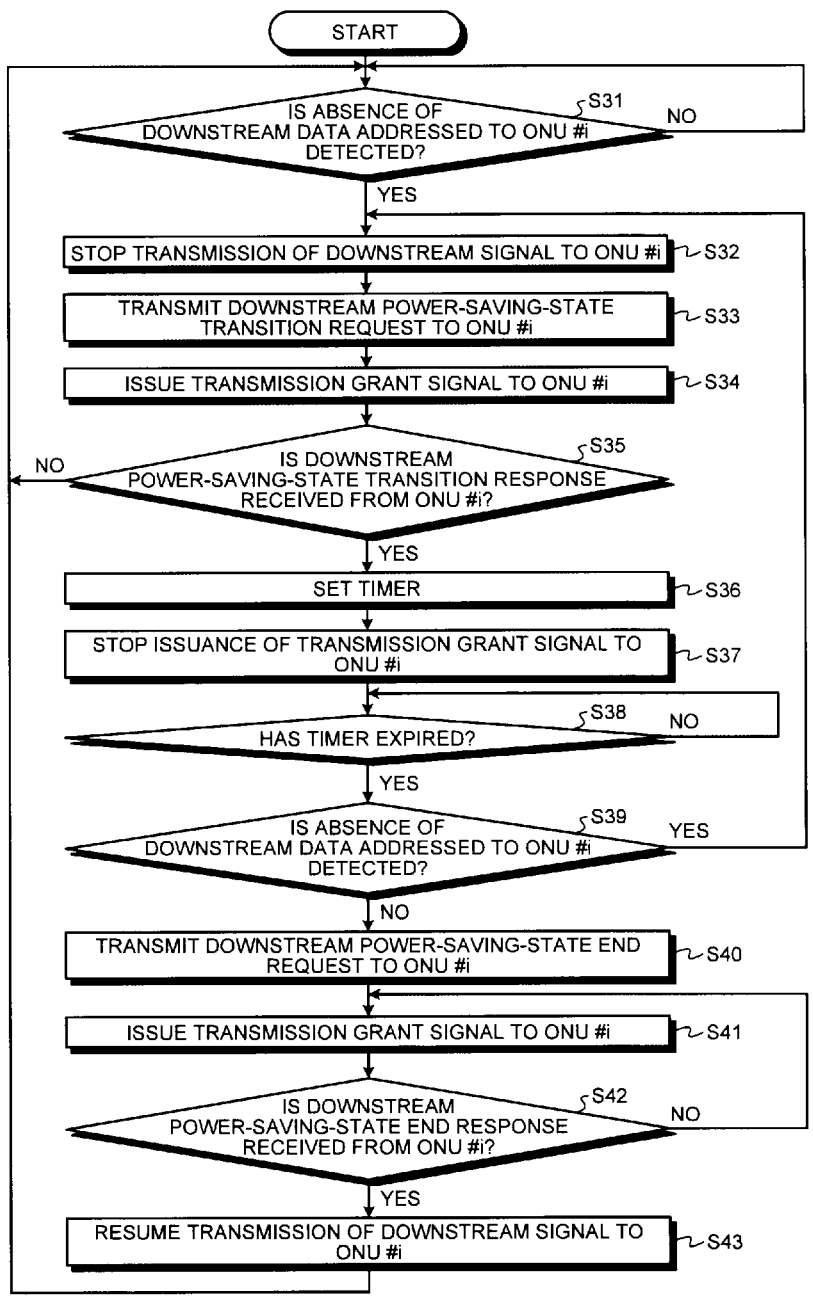
FIG. 10 is a flowchart illustrating an example of a power-saving control procedure of an OLT in the first embodiment.

Next, the detailed procedure of the power-saving control of the OLT 1 is explained. FIG. 10 is a flowchart illustrating an example of the power-saving control procedure performed by the OLT 1 in the present embodiment.

As shown in FIG. 10, the PON control unit 2 determines whether the absence of downstream data addressed to the ONU #i is detected by referring to the transmission buffer 4 (Step S31), and when the PON control unit 2 determines that the absence of downstream data addressed to the ONU #i is not detected at Step S31 (No at Step S31), the process returns to Step S31.

When the PON control unit 2 determines that the absence of downstream data addressed to the ONU #i is detected at Step S31 (Yes at Step S31), the PON control unit 2 stops transmission of a downstream signal to the ONU #i (Step S32) and transmits the downstream power-saving-state transition request to the ONU #i (Step S33). Next, the PON control unit 2 transmits the transmission grant signal to the ONU #i (Step S34) and determines whether the downstream power-saving-state transition response is received from the ONU #i (Step S35). When the PON control unit 2 determines that the downstream power-saving-state transition response is not received at Step S35 (No at Step S35), the process returns to Step S31, and when the downstream power-saving-state transition response is received, the timer for measuring the sleep time t specified in the downstream power-saving-state transition request is set (Step S36) and issuance of the transmission grant signal to the ONU #i is stopped (Step S37).

The PON control unit 2 determines whether the timer set at Step S36 expires (time of t has elapsed) (Step S38), and when the PON control unit 2 determines that the timer has not expired (No at Step S38), Step S38 is performs again.

When the PON control unit 2 determines that the timer expires (Yes at Step S38), the PON control unit 2 determines whether the absence of downstream data addressed to the ONU #i is detected by referring to the transmission buffer 4 (Step S39). The method of referring to data on the transmission buffer 4 when determining whether there is downstream data addressed to the ONU #i is an example of this determining method, and it is applicable to determine by other methods (for example, data transmission request and notification from the network side).

At Step S39, when the absence of downstream data addressed to the ONU #i is not detected (No at Step S39), the downstream power-saving-state end request is transmitted to the ONU #i (Step S40), the transmission grant signal is transmitted to the ONU #i (Step S41), and it is determined whether the downstream power-saving-state end response is received from the ONU #i (Step S42). When it is determined at Step S42 that the downstream power-saving-state end response is received (Yes at Step S42), transmission of a downstream signal (signal including downstream data) to the ONU #i is resumed (Step S43). On the other hand, when it is determined at Step S42 that the downstream power-saving-state end response is not received (No at Step S42), the process returns to Step S41. Moreover, at Step S39, when the absence of downstream data addressed to the ONU #i is detected (Yes at Step S39), the process returns to Step S32.

Figure 11:
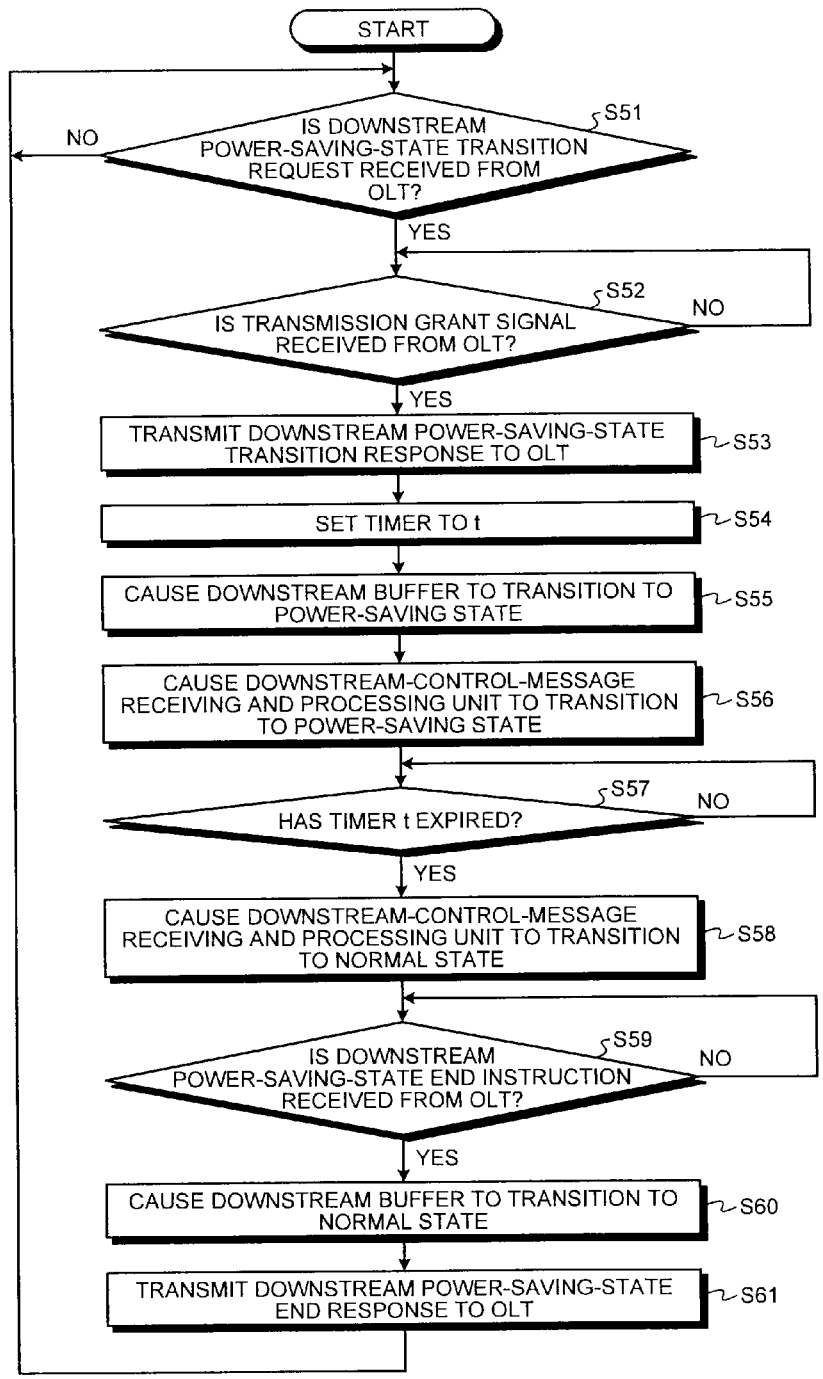
FIG. 11 is a flowchart illustrating an example of a power-saving control procedure performed by an ONU in the first embodiment.

Next, the detailed procedure of the power-saving control of the ONU #i is explained. FIG. 11 is a flowchart illustrating an example of the power-saving control procedure performed by the ONU #i in the present embodiment. In the ONU #i, the PON control unit 11 determines whether the downstream power-saving-state transition request is received from the OLT 1 (Step S51).

At Step S51, when the PON control unit 11 determines that the downstream power-saving-state transition request is received from the OLT 1 (Yes at Step S51), the PON control unit 11 determines whether the transmission grant signal is received (Step S52). At Step S51, when the PON control unit 11 determines that the downstream power-saving-state transition request is not received from the OLT 1 (No at Step S51), Step S51 is performed again.

When the PON control unit 11 determines that the transmission grant signal is received at Step S52 (Yes at Step S52), the PON control unit 11 transmits the downstream power-saving-state transition response to the OLT 1 (Step S53) and sets the timer for measuring the sleep time t specified in the downstream power-saving-state transition request (Step S54).

Then, the PON control unit 11 causes the reception buffer 13 to transition to the power-saving state (Step S55) and moreover, causes the downstream-control-message receiving and processing unit to transition to the power-saving state (Step S56). At Step S55, in the same manner to the above Step S14, the Tx 162-1 of the PHY 16-1 and the Tx 162-2 of the PHY 16-2 can also be transitioned to the power-saving state.

Next, the PON control unit 11 determines whether the timer expires (Step S57), and when the PON control unit 11 determines that the timer has not expired (No at Step S57), Step S57 is performed again. When the PON control unit 11 determines that the timer expires (Yes at Step S57), the PON control unit 11 causes the downstream-control-message receiving and processing unit to transition to the normal state (Step S58).

Then, the PON control unit 11 determines whether the downstream power-saving-state end request is received from the OLT 1 (Step S59), and when the PON control unit 11 determines that the downstream power-saving-state end request is not received (No at Step S59), Step S59 is performed again.

At Step S59, when the PON control unit 11 determines that the downstream power-saving-state end request is received from the OLT 1 (Yes at Step S59), the PON control unit 11 causes the reception buffer 13 to transition to the normal state (Step S60) and transmits the downstream power-saving-state end response to the OLT 1 (Step S61), and the process returns to Step S51.

In the present embodiment, the PON control unit 11 includes the function of causing the reception buffer 13 and the downstream-control-message receiving and processing unit to transition to the power-saving state (instructing to transition to the power-saving state) and the function of causing them to return to the normal state, i.e., the function as a downstream power-saving control unit, alternatively, it is applicable to include the downstream power-saving control unit (controller) separately from the PON control unit 11 and cause the downstream power-saving control unit to perform part or all of the processes performed by the PON control unit 11 in the power-saving control.

As above, in the present embodiment, the OLT 1 transmits the downstream power-saving-state transition request to the ONU #i when downstream data addressed to the ONU #i is not present and the ONU #i that received the downstream power-saving-state transition request is caused to transition to the downstream power-saving state. Therefore, in the period in which downstream data from the OLT 1 to the ONU #i is not present, the ONU #i can cause the component necessary for processing downstream data, such as the reception buffer 13, to save power, enabling to reduce the power consumption of the ONU #i compared with the conventional technology.

Moreover, in the PON system in this embodiment, it is possible to selectively use the first sleep mode in which reception of the control message and downstream data is paused and the second sleep mode in which the PON system is on standby in a state capable of receiving the control message and a reception process of downstream data is not performed depending on the needs. Therefore, when the ONU #1 is in the power-saving state, even if it is needed to be intermittently in the receiving state, power saving in this receiving state can be realized.

Second Embodiment

Figure 12:
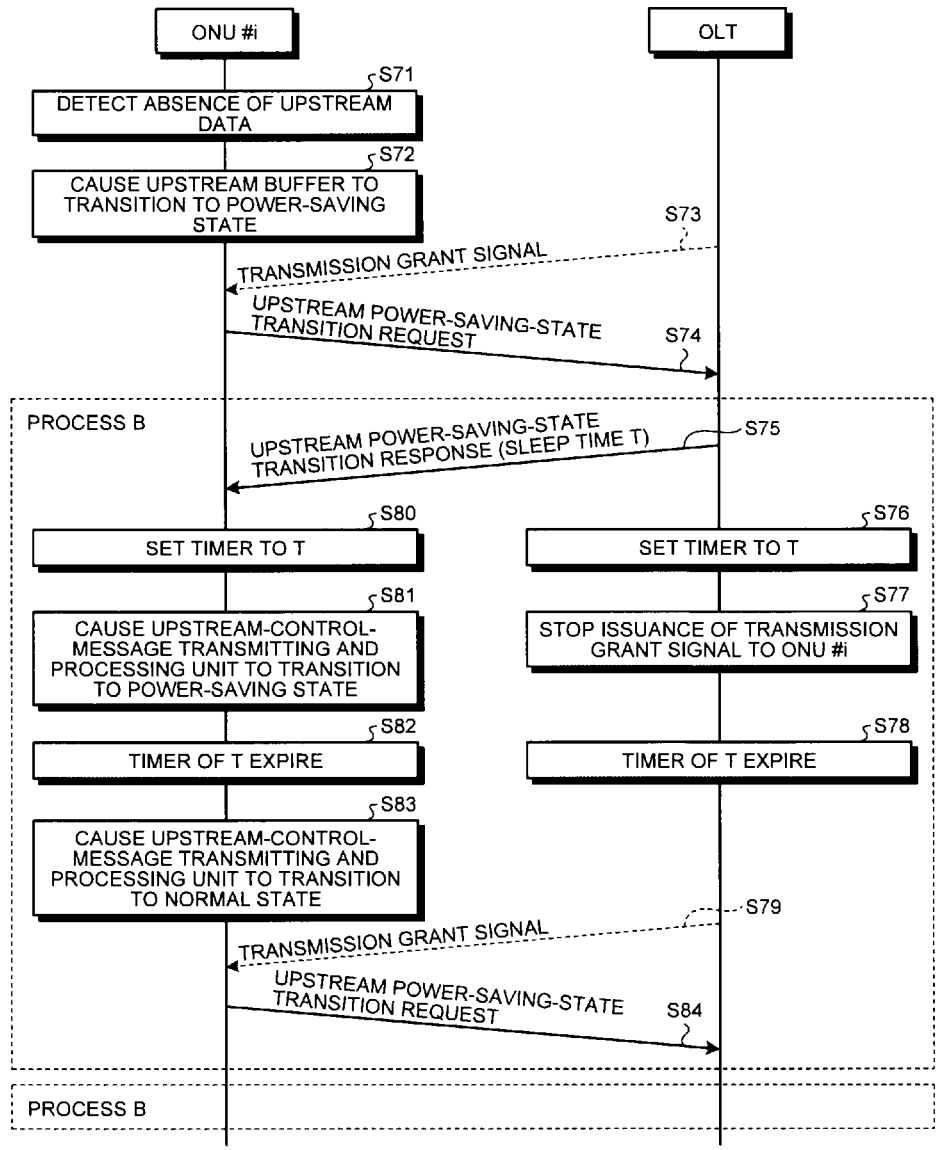
FIG. 12 is a sequence diagram illustrating an example of a power-saving control procedure of a PON system in a second embodiment.

FIG. 12 is a sequence diagram illustrating an example of a power-saving control procedure in the second embodiment of a PON system according to the present invention. The configuration of the PON system in the present embodiment is the same as the configuration of the PON system in the first embodiment. Moreover, the configuration of the OLT and the ONU in the present embodiment is the same as that of the OLT 1 and the ONUs 10-1 to 10-3 in the first embodiment. The point different from the first embodiment is explained below.

In the first embodiment, the OLT 1 transmits the downstream power-saving-state transition request to the ONU #i when downstream data addressed to the ONU #i is not present. In the present embodiment, moreover, when the ONU #i satisfies a predetermined condition, an upstream power-saving-state transition request is transmitted to the OLT 1.

In the first embodiment, explanation is given for a request for transitioning to the sleep mode from the ONU, i.e., the sleep mode related to communication in the upstream direction, however, in the first embodiment, it is not specified when the ONU transmits a request for transitioning to the sleep mode, that is, a trigger for transition request transmission of the sleep mode. In the present embodiment, this trigger is specifically explained to realize the transition request procedure of the sleep mode of the ONU.

In the present embodiment, the ONU #i determines the presence or absence of upstream data, and when the ONU #i determines that upstream data is not present, the ONU #1 transmits the upstream power-saving-state transition request. As a determination condition when determining the absence of upstream data, for example, it is possible to set the case of detecting transition of all terminals (in the present embodiment, the terminals 20-1 and 20-2) connected to itself to the power-saving state, for example, by a method such as an LPI reception defined in IEEE802.3az, the case of detecting that the power of all terminals connected to itself is OFF (not in operation), the case of not receiving upstream data for a certain period from terminals connected to itself, or the like. In the present embodiment, the PHYs 16-1 and 16-2 perform these determinations and notify the PON control unit 11 of the determination result. In other words, in the present embodiment, the PHYs 16-1 and 16-2 have a function as an upstream-data detecting unit that detects the presence or absence of upstream data from the terminals 20-1 and 20-2.

The power-saving control procedure in the present embodiment is explained with reference to FIG. 12. First, in the ONU #i, the PHYs 16-1 and 16-2 determine that upstream data is not present based on the above determination condition and notify the PON control unit 11 of the determination result (Step S71). The PON control unit 11 causes the transmission buffer 12 to transition to the power-saving state (Step S72).

Next, when the PON control unit 11 of the ONU #i receives the transmission grant signal from the OLT 1 (Step S73), the PON control unit 11 transmits the upstream power-saving-state transition request to the OLT 1 (Step S74).

The PON control unit 2 of the OLT 1 that received the upstream power-saving-state transition request transmits an upstream power-saving-state transition response including a sleep time T (duration of an upstream power-saving state) to the ONU #i (Step S75). Then, the PON control unit 2 sets a timer for measuring the sleep time T (Step S76) and stops issuance of the transmission grant signal to the ONU #i (Step S77). Thereafter, when the timer expires (when time of T has elapsed) (Step S78), the PON control unit 2 transmits the transmission grant signal to the ONU #i (Step S79).

On the other hand, in the ONU #i that received the upstream power-saving-state transition response, the PON control unit 11 sets the timer for measuring the sleep time T included in the upstream power-saving-state transition response (Step S80). Then, the PON control unit 11 causes an upstream-control-message transmitting and processing unit (such as the Tx 141 of the optical transceiver 14 and an upstream-control-message processing function part of the PON control unit 11) to transition to the power-saving state (Step S81).

The upstream-control-message transmitting and processing unit is composed of components necessary for the ONU #i to transmit the control message to the OLT 1, such as the Tx 141 of the optical transceiver 14 and the upstream-control-message processing function part of the PON control unit 11. Moreover, the state in which the transmission buffer 12 and the upstream-control-message transmitting and processing unit are set to the power-saving state is called the upstream power-saving state. Moreover, the transmission buffer 12 and the upstream-control-message transmitting and processing unit together can be considered as an upstream-signal processing unit and the upstream power-saving state can be considered as a state in which the upstream-signal processing unit is transitioned to the power-saving state.

Thereafter, when the timer expires (time of T has elapsed) (Step S82), the PON control unit 11 causes the upstream-control-message transmitting and processing unit to transition to the normal state (Step S83), and when the transmission grant signal transmitted at Step S79 is received, the PON control unit 11 transmits the upstream power-saving-state transition request to the OLT 1 (Step S84).

The above processes at Step S75 to Step S84 are defined as a process B, and the process B is repeatedly performed while the ONU #i determines that upstream data is not present. While repeating this process B, the upstream-control-message transmitting and processing unit once returns to the normal mode every sleep time T, however, the upstream buffer 12 can maintain the power-saving state.

Figure 13:
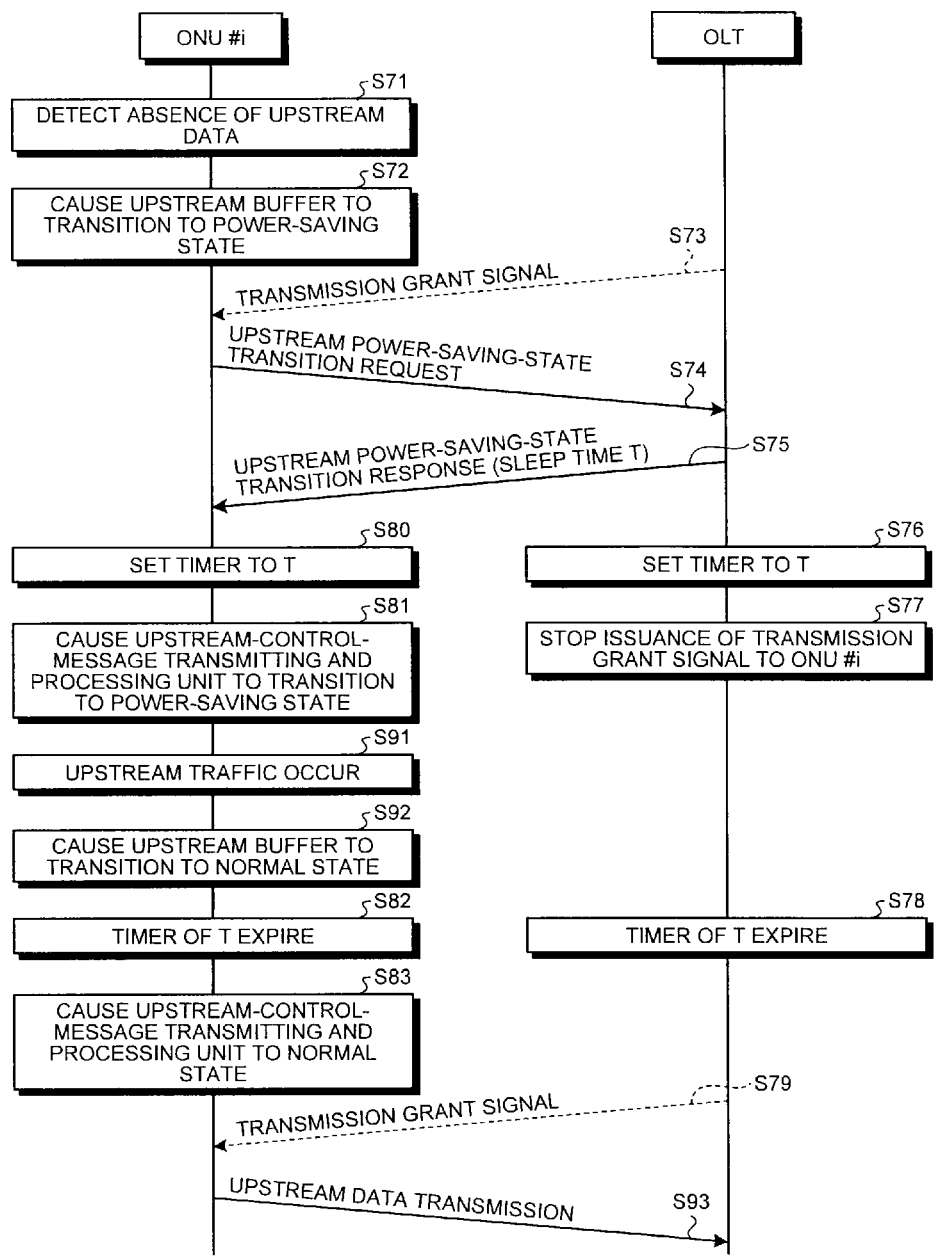
FIG. 13 is a sequence diagram illustrating another example of a power-saving control procedure in the second embodiment.

FIG. 13 is a sequence diagram illustrating another example of the power-saving control procedure in the present embodiment. First, Step S71 to Step S81 are performed in the same manner to Step S71 to Step S81 explained in FIG. 12.

In the example in FIG. 13, in the ONU #i, after Step S81, an upstream traffic occurs and the PHYs 16-1 and 16-2 determine that upstream data is present and notify the PON control unit 11 of the determination result (Step S91). The PON control unit 11 causes the transmission buffer 12 to transition to the normal state and stores the upstream data received from the terminals 20-1 and 20-2 in the transmission buffer 12 (Step S92).

Then, when the timer expires (time of T has elapsed) (Step S83) and the PON control unit 11 receives the transmission grant signal transmitted at Step S79, the PON control unit 11 reads out the upstream data stored in the transmission buffer 12 and transmits it to the OLT 1 (Step S93). Thereafter, the normal communication is performed.

As the control message for the upstream power-saving-state transition request and the upstream power-saving-state transition response described above, it is applicable to use the "Sleep mode change request" message shown in FIG. 7 and FIG. 8 and the "Sleep mode change acknowledge" message shown in FIG. 4 to FIG. 6, respectively, aside from that shown in FIG. 9. When these messages are used also in the control of the downstream power-saving state in the first embodiment, information for identifying whether it is a message related to the upstream power-saving state or a message related to the downstream power-saving state is included in a format.

Figure 14:
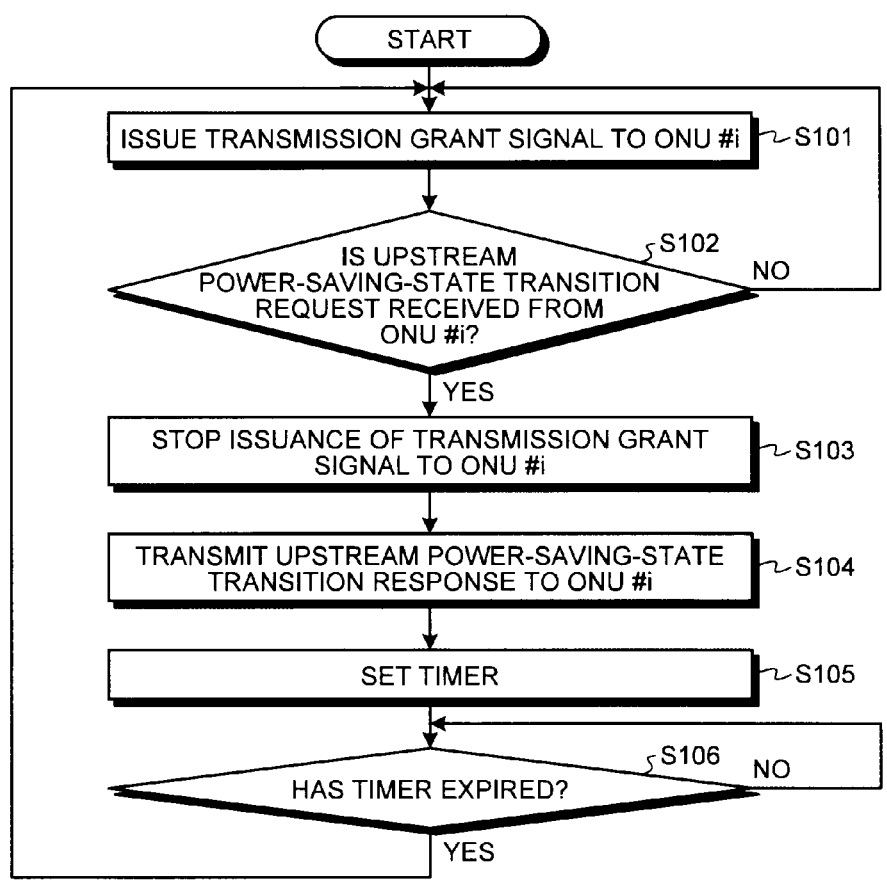
FIG. 14 is a flowchart illustrating an example of a power-saving control procedure performed by an OLT in the second embodiment.

Next, the detailed procedure of the power-saving control of the OLT 1 is explained. FIG. 14 is a flowchart illustrating an example of the power-saving control procedure performed by the OLT 1 in the present embodiment. As shown in FIG. 14, the PON control unit 2 of the OLT 1 plans the time to give transmission permission to each ONU in the same manner to the conventional PON control and transmits the transmission grant signal to the ONU #i (Step S101). Next, the PON control unit 2 determines whether the upstream power-saving-state transition request is received from the ONU #i (Step S102).

When the PON control unit 2 determines that the upstream power-saving-state transition request is not received from the ONU #i at Step S102 (No at Step S102), the process returns to Step S101. When the PON control unit 2 determines that the upstream power-saving-state transition request is received from the ONU #i at Step S102 (Yes at Step S102), the PON control unit 2 stops issuance of the transmission grant signal to the ONU #i (Step S103). Then, the PON control unit 2 transmits the power-saving-state transition response including the sleep time T to the ONU #i (Step S104) and sets the timer for measuring T (Step S105).

Next, the PON control unit 2 determines whether the timer expires (time of T has elapsed) (Step S106), and when the PON control unit 2 determines that the timer expires (Yes at Step S106), the process returns to Step S101. When the PON control unit 2 determines that the timer has not expired (No at Step S106), Step S106 is performed again.

Next, the detailed procedure of the power-saving control of the ONU #i is explained. FIG. 15 is a flowchart illustrating an example of the power-saving control procedure performed by the ONU #i in the present embodiment. In the ONU #i, the PHYs 16-1 and 16-2 determine whether upstream data is present based on the determination condition of the presence or absence of upstream data described above and notify the PON control unit 11 of the determination result (Step S111). When the determination result is a determination result indicating the presence of upstream data (No at Step S111), the PON control unit 11 causes the transmission buffer 12 to transition to the normal state and the process proceeds to Step S115.

On the other hand, at Step S111, when the absence of upstream data is detected (Yes at Step S111), the PON control unit 11 determines whether the transmission buffer 12 is in the power-saving state (Step S112). When the PON control unit 11 determines that the transmission buffer 12 is not in the power-saving state (No at Step S112), the PON control unit 11 causes the transmission buffer 12 to transition to the power-saving state (Step S113) and the process proceeds to Step S115. When the PON control unit 11 determines that the transmission buffer 12 is in the power-saving state (Yes at Step S112), the process proceeds to Step S115.

At Step S115, the PON control unit 11 determines whether the transmission grant signal is received from the OLT 1 (Step S115). When the PON control unit 11 determines that the transmission grant signal is not received (No at Step S115), the process returns to Step S111.

When the PON control unit 11 determines that the transmission grant signal is received from the OLT 1 at Step S115 (Yes at Step S115), the PON control unit 11 determines whether the transmission buffer 12 is in the power-saving state (Step S116). When the PON control unit 11 determines that the transmission buffer 12 is not in the power-saving state (No at Step S116), the PON control unit 11 determines whether data is stored in the transmission buffer 12 (Step S123).

When the PON control unit 11 determines that data is stored in the transmission buffer 12 at Step S123 (Yes at Step S123), the PON control unit 11 transmits upstream data stored in the transmission buffer 12 to the OLT 1 (Step S124). When the PON control unit 11 determines that data is not stored in the transmission buffer 12 at Step S123 (No at Step S123), the process returns to Step S111.

Moreover, when the PON control unit 11 determines that the transmission buffer 12 is in the power-saving state at Step S116 (Yes at Step S116), the PON control unit 11 transmits the upstream power-saving-state transition request to the OLT 1 (Step S117). Then, the PON control unit 11 determines whether an upstream power-saving-state transition response is received from the OLT 1 (Step S118), and when the PON control unit 11 determines that the upstream power-saving-state transition response is not received (No at Step S118), the process returns to Step S111.

When the PON control unit 11 determines that the upstream power-saving-state transition response is received from the OLT 1 at Step S118 (Yes at Step S118), the PON control unit 11 causes the upstream-control-message transmitting and processing unit to transition to the power-saving state (Step S119), sets the timer for measuring the sleep time T included in the upstream power-saving-state transition response (Step S120), and proceeds to Step S121, and the PON control unit 11 determines whether the timer for measuring the sleep time T of the upstream power-saving state expires (Step S121). When the timer for measuring the sleep time T of the upstream power-saving state has not expired at Step S121 (No at Step S121), the process returns to Step S121. When the timer for measuring the sleep time T of the upstream power-saving state expires at Step S121 (Yes at Step S121), the PON control unit 11 causes the upstream-control-message transmitting and processing unit to transition to the normal state (Step S122).

In the above explanation, the example is explained in which the trigger for the upstream power-saving-state transition and the trigger for the downstream power-saving-state transition are different and therefore control of the downstream power-saving-state transition in the first embodiment and control of the upstream power-saving-state transition in the present embodiment are performed independently, alternatively, for example, when all terminals connected to the ONU #i are turned OFF due to a failure or the like it is also considered to perform the power-saving-state transition in both directions simultaneously. In such case, the ONU transmits the upstream power-saving-state transition request and the downstream power-saving-state transition request and thereafter, transitions to the downstream power-saving-state by the procedure similar to the first embodiment.

The ONU can transmit the upstream power-saving-state transition request and the downstream power-saving-state transition request independently instead of transmitting them simultaneously.

Moreover, downstream data addressed to the ONU #i arrived to the OLT 1 while the ONU #i is in the downstream power-saving state can be discarded without storing it in the transmission buffer 4. In this case, for example, information indicating whether downstream data can be discarded is included in the downstream power-saving-state transition request to be transmitted from the ONU and the OLT 1 can determine whether to discard or store the downstream data based on the information.

In the above explanation, both control of the downstream power-saving-state transition in the first embodiment and control of the upstream power-saving-state transition in the present embodiment are performed, alternatively, only the control of the upstream power-saving-state transition explained in the present embodiment can be performed.

In the present embodiment, the PON control unit 11 includes the function of causing the transmission buffer 12 and the upstream-control-message transmitting and processing unit to transition to the power-saving state (instructing to transition to the power-saving state) and the function of returning to the normal state, i.e., the function as an upstream power-saving control unit, alternatively, it is applicable to include the upstream power-saving control unit separately from the PON control unit 11 and cause the upstream power-saving control unit to perform part or all of the processes performed by the PON control unit 11 in the above power-saving control.

As above, in the present embodiment, when the PHYs 16-1 and 16-2 of the ONU #i determine that upstream data transmitted from the terminals is not present, the transmission buffer 12 is caused to transition to the power-saving state, the upstream power-saving-state transition request is transmitted to the OLT 1, and the OLT 1 transmits the upstream power-saving-state transition response granting transition of the ONU #i to the upstream power-saving state. Then, in the ONU #i, when the power-saving-state transition response is received, the upstream-control-message transmitting and processing unit is caused to transition to the power-saving state. Therefore, in the ONU #i, the effect of the first embodiment can be realized and moreover, the power consumption can be reduced also in the communication in the upstream direction.

INDUSTRIAL APPICABILITY

As above, the PON system and the power saving method according to the present invention are useful for a PON system that aims at power saving and is particularly suitable for a PON system in which a state with no communication data present may be maintained for a long time.

REFERENCE SIGNS LIST

1 OLT
2 PON CONTROL UNIT
3, 13 RECEPTION BUFFER
4, 12 TRANSMISSION BUFFER
5, 14 OPTICAL TRANSCEIVER
6 WDM
7 PHY
10-1 to 10-3 ONU
11 PON CONTROL UNIT
20-1, 20-2 TERMINAL
30 SUBSCRIBER LINE
40 SPLITTER
51, 142, 161-1, 161-2 Rx
52, 141, 162-1, 162-2 Tx

The invention claimed is:

1. A passive optical network (PON) system in which a station-side terminal apparatus and a subscriber-side terminal apparatus are connected by using an optical line, wherein:
the subscriber-side terminal apparatus includes:
an optical transmitter that transmits an optical signal to the station-side terminal apparatus, and
an upstream-data processor that performs processing on upstream data that is to be transmitted to the station-side terminal apparatus via the optical transmitter, the upstream-data processor including an upstream memory that stores upstream data that is to be transmitted from the optical transmitter;
the subscriber-side terminal apparatus is operable in power-saving modes including a first power-saving mode and a second power-saving mode and in a normal mode, wherein
in the first power-saving mode, the optical transmitter is in a power-saving state,
in the second power-saving mode, transmission and reception of a control message to and from the station-side terminal apparatus are possible, operation is performed in accordance with a control message received form the station-side terminal apparatus, and the upstream-data processor is in a power-saving state, and
in the normal mode, transmission and reception of data are possible; and
the station-side terminal apparatus includes:
a control-message transmitter that transmits a control message to the subscriber-side terminal apparatus, and
a controller that controls, by using the control message that is transmitted via the control-message transmitter, transition of the subscriber-side terminal apparatus between the normal mode and the power-saving modes.

2. The PON system according to claim 1, wherein:
the subscriber-side terminal apparatus includes:
an optical receiver that receives an optical signal from the station-side terminal apparatus, and
a downstream-data processor that performs processing on downstream data that is received from the station-side terminal apparatus via the optical receiver,
in the first power-saving mode, the optical receiver is in a power-saving state, and
in the second power-saving mode, the downstream-data processor is in a power-saving state.

3. The PON system according to claim 2, wherein the downstream-data processor includes at least one of:
a downstream-data memory that stores downstream data that is received by the optical receiver, and
a signal processor that performs processing on downstream data that is received by the optical receiver and that is to be transmitted to a terminal connected to the own apparatus.

4. The PON system according to claim 1, wherein:
the subscriber-side terminal apparatus maintains in the first power-saving mode for a predetermined time and, after elapse of the predetermined time, transitions to the second power-saving mode, and
if, during the second power-saving mode, end of a power-saving mode is notified by a control message transmitted from the station-side terminal apparatus, the subscriber-side terminal apparatus transitions to the normal mode.

5. The PON system according to claim 4, wherein the predetermined time for which the first power-saving mode maintains is decided based on a sleep time that is notified by the station-side terminal apparatus.

6. The PON system according to claim 4, further comprising a downstream-data processor which includes at least one of:
a downstream-data memory that stores downstream data that is received by the optical receiver, and a signal processor that performs processing on downstream data that is received by the optical receiver and that is to be transmitted to a terminal connected to the own apparatus.

7. The PON system according to claim 1, wherein:
the subscriber-side terminal apparatus maintains in the first power-saving mode for a predetermined time and, after elapse of the predetermined time, transitions to the second power-saving mode, and
if the subscriber-side terminal apparatus does not determine to end the power-saving mode during the second power-saving mode, the subscriber-side terminal apparatus transitions to the first power-saving mode.

8. The PON system according to claim 7, wherein the predetermined time for which the first power-saving mode maintains is decided based on a sleep time that is notified by the station-side terminal apparatus.

9. The PON system according to claim 7, further comprising a downstream-data processor which includes at least one of:
a downstream-data memory that stores downstream data that is received by the optical receiver, and
a signal processor that performs processing on downstream data that is received by the optical receiver and that is to be transmitted to a terminal connected to the own apparatus.

10. The PON system according to claim 1, wherein the upstream-data processor includes a signal processor that performs processing on upstream data that is received from a terminal connected to the own apparatus.

11. The PON system according to claim 10, further comprising a downstream-data processor which includes at least one of:
a downstream-data memory that stores downstream data that is received by the optical receiver, and
a signal processor that performs processing on downstream data that is received by the optical receiver and that is to be transmitted to a terminal connected to the own apparatus.

12. A subscriber-side terminal apparatus that is connectable to a station-side terminal apparatus via an optical line, the subscriber-side terminal apparatus comprising:
an optical transmitter that transmits an optical signal to the station-side terminal apparatus; and
an upstream-data processor that performs processing on upstream data that is to be transmitted to the station-side terminal apparatus via the optical transmitter; the upstream-data processor including an upstream memory that stores upstream data that is to be transmitted from the optical transmitter, wherein
the subscriber-side terminal apparatus is operable in power-saving modes including a first power-saving mode and a second power-saving mode and in a normal mode,
in the first power-saving mode, the optical transmitter is in a power-saving state,
in the second power-saving mode, transmission and reception of a control message to and from the station-side terminal apparatus are possible, operation is performed in accordance with a control message received from the station-side terminal apparatus, and the upstream-data processor is in a power-saving state,
in the normal mode, transmission and reception of data are possible, and
the station-side terminal apparatus includes a power controller that controls transition between the normal mode and the power-saving modes based on a control message that is transmitted from the station-side terminal apparatus.

13. The subscriber-side terminal apparatus according to claim 12, further comprising:
an optical receiver that receives an optical signal from the station-side terminal apparatus; and
a downstream-data processor that performs processing on downstream data that is received from the station-side terminal apparatus via the optical receiver, wherein
in the first power-saving mode, the optical receiver is in a power-saving state, and
in the second power-saving mode, the downstream-data processor is in a power-saving state.

14. The subscriber-side terminal apparatus according to claim 12, wherein:
the power controller maintains the first power-saving mode for a predetermined time and, after elapse of the predetermined time, causes the subscriber-side terminal apparatus to transition to the second power-saving mode, and
if, during the second power-saving mode, end of a power-saving mode is notified by means of a control message transmitted from the station-side terminal apparatus, the power controller causes the subscriber-side terminal apparatus to transition to the normal mode.

15. The subscriber-side terminal apparatus according to claim 14, wherein the predetermined time for which the first power-saving mode continues is decided based on a sleep time that is notified by the station-side terminal apparatus.

16. The subscriber-side terminal apparatus according to claim 12, wherein:
the power controller maintains the own apparatus in the first power-saving mode for a predetermined time and, after elapse of the predetermined time, causes the own apparatus to transition to the second power-saving mode, and
if, during the second power-saving mode, it is not determined to end the power-saving mode, the power controller causes the own apparatus to transition to the first power-saving mode.

17. The subscriber-side terminal apparatus according to claim 16, wherein the predetermined time for which the first power-saving mode continues is decided based on a sleep time that is notified by the station-side terminal apparatus.

18. The subscriber-side terminal apparatus according to claim 12, further comprising:
an upstream-data detector that determines whether there is upstream data to be transmitted from a terminal connected to the own apparatus to the station-side terminal apparatus, wherein
when the upstream-data detector determines that there is no upstream data, a power saving processor transitions the upstream-data memory to a power-saving state and transmits a transition request message that requests transition to the power-saving mode to the station-side terminal apparatus, and
when a transition response message is received from the station-side terminal apparatus, the power saving processor performs control based on the transition response message such that the first power-saving mode is maintained for a predetermined time.

19. The subscriber-side terminal apparatus according to claim 18, wherein the upstream-data detector detects that upstream data is not present in at least one of a case where a terminal connected to the own apparatus is not operated, a case where it is detected that a terminal connected to the own apparatus is in a power-saving state, and a case where communication data does not arrive from a terminal connected to the own apparatus for a predetermined period.

20. A station-side terminal apparatus that is connectable to a subscriber-side terminal apparatus via an optical line, the subscriber-side terminal apparatus being operable in power-saving modes including a first power-saving mode and a second power-saving mode and in a normal mode, wherein:
  in the first power-saving mode, an optical transmitter is in a power-saving state,
  in the second power-saving mode, transmission and reception of a control message to and from the station-side terminal apparatus are possible, operation is performed in accordance with a control message received from the station-side terminal apparatus, and an upstream-data processor that performs processing on upstream data is in a power-saving state, the upstream-data processor including an upstream-data memory that stores upstream data that is to be transmitted from the optical transmitter,
  in the normal mode, transmission and reception of data are possible, and
  the station-side terminal apparatus comprises:
    a control-message transmitter that transmits a control message to the subscriber-side terminal apparatus; and
    a controller that controls, by using the control message that is transmitted via the control-message transmitter, transition of the subscriber-side terminal apparatus between the normal mode and the power-saving modes.

21. The station-side terminal apparatus according to claim 20, wherein:
  in the first power-saving mode, the subscriber-side terminal apparatus sets an optical receiver to a power-saving state, and
  in the second power-saving mode, the subscriber-side terminal apparatus sets a downstream-data processor that performs processing on downstream data to a power-saving state.

22. The station-side terminal apparatus according to claim 21, wherein:
  the controller, before transmitting downstream transmission data to the subscriber-side terminal apparatus, transmits a control message to notify end of the power-saving mode, and
  the controller controls the subscriber-side terminal apparatus to a state capable of receiving the transmission data.

23. The station-side terminal apparatus according to claim 20, further comprising:
  a transmission-data memory that stores transmission data to be transmitted to the subscriber-side terminal apparatus, wherein
  the controller transmits a power-saving-state transition request that requests the subscriber-side terminal apparatus to set the optical receiver to a power-saving state for a predetermined time as the control message when determining that transmission data addressed to the subscriber-side terminal apparatus is not present in the transmission-data memory.

24. The station-side terminal apparatus according to claim 23, wherein the controller, when transmission data addressed to the subscriber-side terminal apparatus is received after transmitting the downstream power-saving-state transition request to the subscriber-side terminal apparatus, stores the transmission data in the transmission-data memory, and transmits a power-saving-state end request instructing to end of a power-saving-state after elapse of the predetermined time requested by transmitted power-saving-state transition request to the subscriber-side terminal apparatus, and on the other hand, when determining that transmission data addressed to the subscriber-side terminal apparatus is not present in the transmission-data memory after transmitting the power-saving-state transition request to the subscriber-side terminal apparatus, transmits the power-saving-state transition request to the subscriber-side terminal apparatus again.

25. A power-saving method in a passive optical network (PON) system in which a station-side terminal apparatus is connected to a plurality of subscriber-side terminal apparatuses by an optical line, wherein:
  the subscriber-side terminal apparatus is operable in power-saving modes including a first power-saving mode and a second power-saving mode and in a normal mode,
  in the first power-saving mode, an optical transmitter is in a power-saving state,
  in the second power-saving mode, transmission and reception of a control message to and from the station-side terminal apparatus are possible, operation is performed in accordance with a control message received from the station-side terminal apparatus, and an upstream-data processor that performs processing on upstream data is in a power-saving state,
  the upstream-data processor includes an upstream-data memory that stores upstream data that is to be transmitted from the optical transmitter, and
  in the normal mode, transmission and reception of data are possible,
  the power-saving method comprising:
    a first transmission step of the station-side terminal apparatus transmitting a control grant message that grants the subscriber-side terminal apparatus to be in the first power-saving mode for a predetermined time;
    a step of the subscriber-side terminal apparatus transitioning to the first power-saving mode when the control grant message is received;
    a second transmission step of the station-side terminal apparatus transmitting a control message after an end of the predetermined time;
    a step of the subscriber-side terminal apparatus receiving the control message and transitioning, after an end of the predetermined time, to the second power-saving mode; and
    a step of the subscriber-side terminal apparatus determining whether to transition to the first power-saving mode or to the normal mode based on a control message received in the second power-saving mode.

26. A subscriber-side terminal apparatus connectable to a station-side terminal apparatus via an optical line, the subscriber-side terminal apparatus comprising:
  an optical transmitter to transmit an optical signal to the station-side apparatus;
  an optical receiver to receive an optical signal from the station-side apparatus;
  a memory for storing upstream data to be transmitted to the station-side terminal apparatus; and
  a controller to control the optical transmitter, the optical receiver, and the memory, wherein:
    the subscriber-side terminal apparatus is operable in power-saving modes including a first power-saving mode and a second power-saving mode and in a normal mode;

in the first power-saving mode, the optical transmitter is in a power-saving state;

in the second power-saving mode, the optical transmitter and the optical receiver are on, transition between the modes is performed in accordance with a control message received from the station-side terminal apparatus, and the memory for storing upstream data is in a power-saving state; and in the normal mode, the optical transmitter, the optical receiver, and the memory are on.

27. A control apparatus of a subscriber-side terminal apparatus, wherein the subscriber-side terminal apparatus comprises an optical transmitter to transmit an optical signal to a station-side apparatus, an optical receiver to receive an optical signal from the station-side apparatus, and a memory for storing upstream data to be transmitted to the station-side terminal apparatus, the control apparatus comprising:

a controller for controlling the optical transmitter, the optical receiver, and the memory, and being operable in power-saving modes including a first power-saving mode and a second power-saving mode and in a normal mode, wherein:

in the first power-saving mode, the optical transmitter is in a power-saving state, in the second power-saving mode, the optical transmitter and the optical receiver are in operation, transition between the modes is performed in accordance with a control message received from the station-side terminal apparatus, and the upstream memory is in a power-saving state, and in the normal mode, the optical transmitter, the optical receiver, and the memory are in operation.

* * * * *